United States Patent
Wu

(10) Patent No.: US 7,448,092 B2
(45) Date of Patent: Nov. 11, 2008

(54) SUN HAT WITH EYEGLASSES

(75) Inventor: Chien-Hsiang Wu, No. 107, Lane 702, Sec. 1, Anjhong Rd., Tainan City (TW)

(73) Assignees: Chin-Shih Wang, Tainan County (TW); Chien-Hsiang Wu, Tainan (TW)

( * ) Notice: Subject to any disclaimer, the term of this patent is extended or adjusted under 35 U.S.C. 154(b) by 645 days.

(21) Appl. No.: 11/244,228

(22) Filed: Oct. 6, 2005

(65) Prior Publication Data
US 2007/0079422 A1    Apr. 12, 2007

(51) Int. Cl.
*A42B 1/00* (2006.01)
(52) U.S. Cl. .................................. 2/171; 2/209.13; 2/15
(58) Field of Classification Search ...................... 2/171, 2/209.13, 195.4, 12, 6.3, 6.4, 6.5, 8.2, 195.2, 2/195.6, 15, 10; 24/3.1, 3.3, 3.12, 572.1, 24/578.1, 585.1, 700, 701, 702; 351/118, 351/111, 155
See application file for complete search history.

(56) References Cited

U.S. PATENT DOCUMENTS

| | | | | |
|---|---|---|---|---|
| 5,533,207 A | * | 7/1996 | Diaz | ................................ 2/10 |
| 6,553,570 B1 | * | 4/2003 | Flynn | ................................ 2/10 |
| 6,662,371 B2 | * | 12/2003 | Shin | ................................ 2/10 |
| 7,147,323 B1 | * | 12/2006 | Wu | ............................. 351/155 |
| 2007/0050888 A1 | * | 3/2007 | Huang | ............................. 2/171 |
| 2007/0271677 A1 | * | 11/2007 | Romanski et al. | .............. 2/171 |

* cited by examiner

*Primary Examiner*—Gary L Welch
*Assistant Examiner*—Alissa J Tompkins
(74) *Attorney, Agent, or Firm*—Rosenberg, Klein & Lee

(57) ABSTRACT

A sun hat has a curve visor, two supporting members secured on the visor, two sliding members, and a pair of eyeglasses; each supporting member has a holding recess on a rear side, and an elongate hole right in front of communicating with the holding recess; each sliding member is linearly displaceable along a respective elongate hole with a base part thereof being held in the holding recess, and with a hollow protruding part sticking through the elongate hole; the eyeglasses have a curved front part, and a connecting part on each temple thereof, and they are connected to the sliding members in an angularly displaceable manner with the connecting parts being held in respective hollow protruding parts of the sliding members; therefore, the eyeglasses can be pivoted from an in-use position to a not-in-use one, and adjusted in position.

1 Claim, 5 Drawing Sheets

SUN HAT WITH EYEGLASSES

BACKGROUND OF THE INVENTION

1. Field of the Invention

The present invention relates to a sun hat with eyeglasses, more particularly one, whose eyeglasses can be pivoted close to a lower side of a visor thereof to be in a not-in-use position, and can be adjusted in position to suit different users.

2. Brief Description of the Prior Art

People usually wear hats to block direct sunlight and prevent heatstroke when taking a walk or doing outdoor exercises. Furthermore, people usually wear sunglasses to protect the eyes from the sun's damaging rays.

When people move indoors, and take off the sunglasses, they can put the sunglasses in their clothing pockets, on top of their hats or in their handbags. No matter which one of the above ways is used, there is risk of the sunglasses getting damaged. And, the sunglasses are prone to fall off if they are positioned on top of hats.

SUMMARY OF THE INVENTION

It is a main object of the invention to provide a sun hat with eyeglasses to overcome the above-mentioned problems. The sun hat of the invention has a curve visor, two supporting members secured on the visor, two sliding members, and a pair of eyeglasses. Each supporting member has a holding recess on a rear side, and an elongate hole right in front of and communicating with the holding recess. Each sliding member is linearly displaceable along a respective one of the elongate holes with a base part thereof being held in the holding recess, and with a protruding part sticking through the elongate hole. The eyeglasses have a curved front part, and a connecting part on each temple thereof, and they are connected to the sliding members in an angularly displaceable manner with the connecting parts being held in respective protruding parts of the sliding members. Thus, the eyeglasses can be pivoted from an in-use position to a not-in-use one, and adjusted in position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
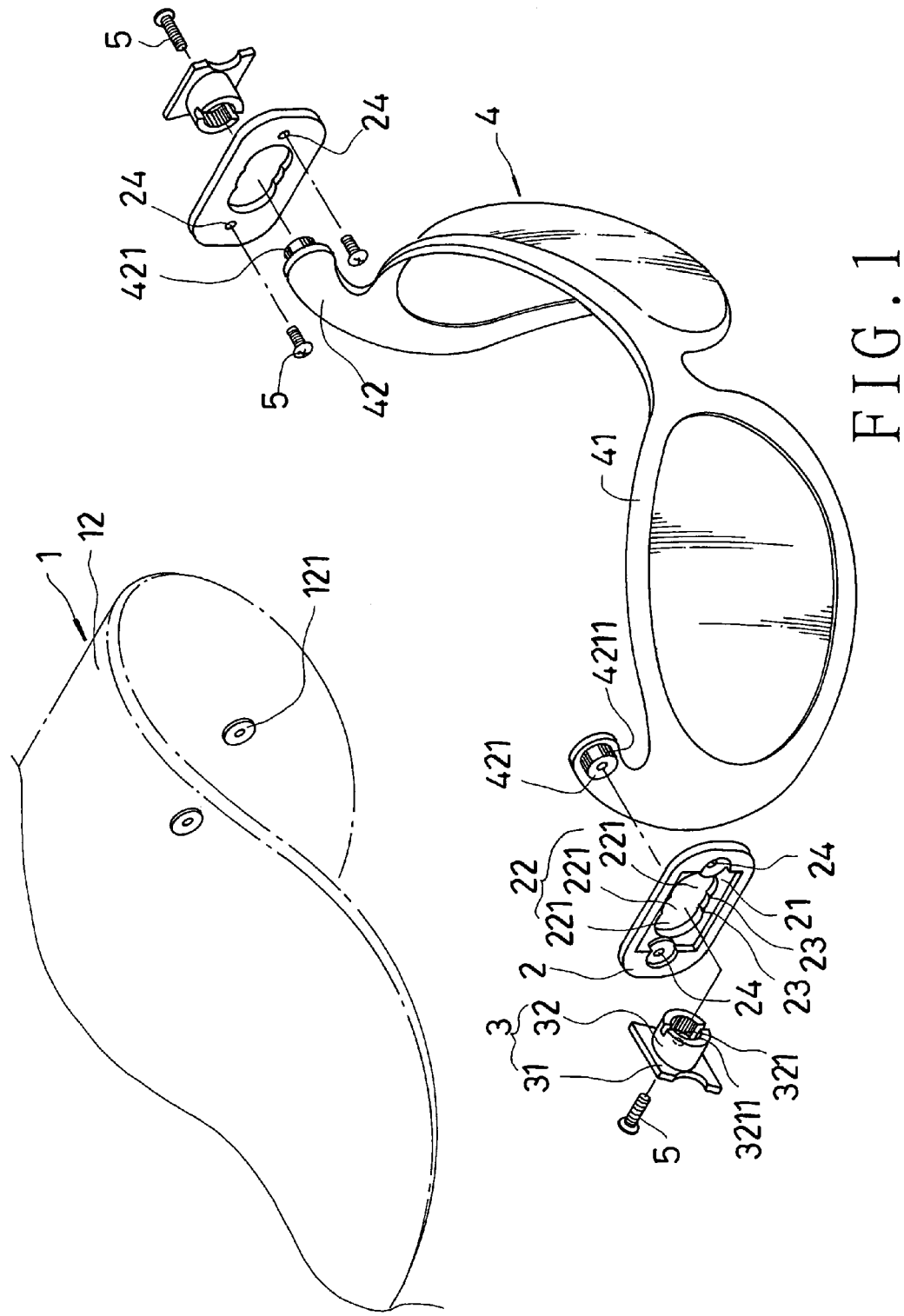
FIG. 1 is an exploded perspective view of the sun hat with eyeglasses in the present invention.
Figure 2:
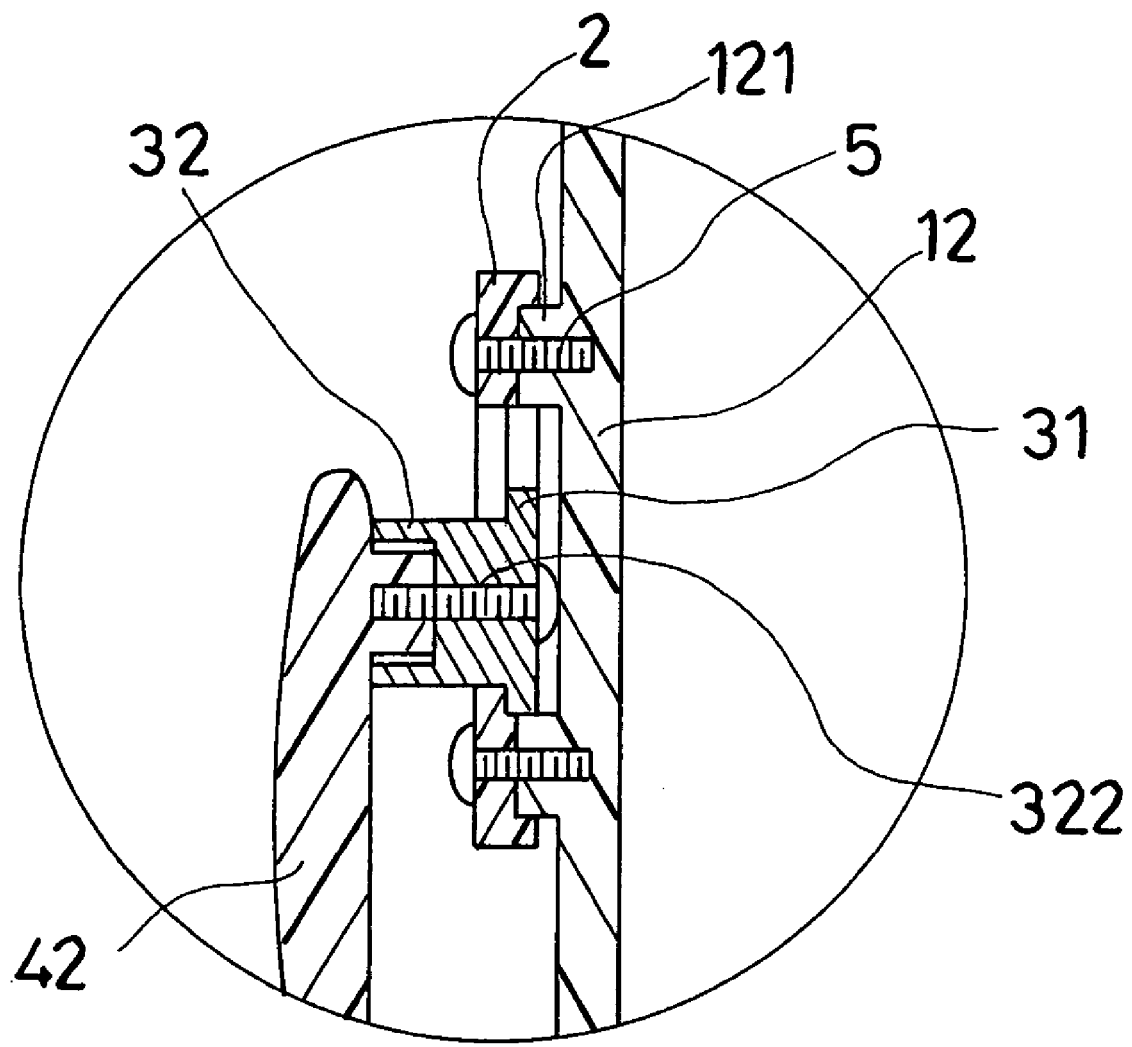
FIG. 2 is a partial lateral sectional view of the present invention.
Figure 3:
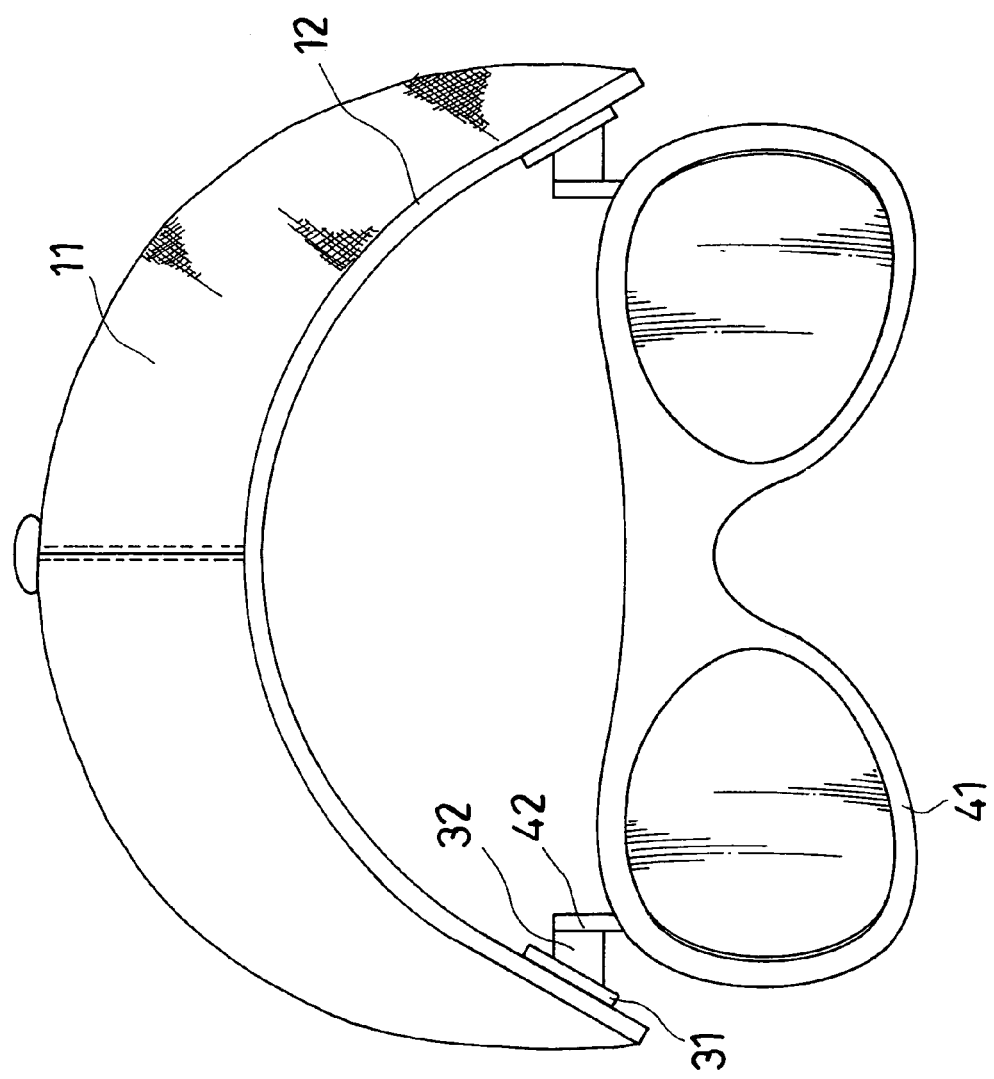
FIG. 3 is a front view of the present invention.

Referring to FIGS. 1 to 5, a preferred embodiment of a sun hat with eyeglasses in the present invention includes a sun hat 1, two supporting members 2, two sliding members 3, and a pair of eyeglasses 4.

The sun hat 1 includes a main body 11, and a visor 12 having a certain curvature. The visor 12 has locating elements 121 secured on two lateral portions thereof.

Each of the supporting members 2 has a holding recess 21 on a rear side thereof, an elongate hole 22 formed right in front of and communicating with the holding recess 21, screw holes 24, and several pairs of opposed projecting portions 23, which are formed on an inward edge of the supporting member 2 that defines the elongate hole 22 for dividing the elongate hole 22 into several holding sections 221. The supporting members 2 are securely joined to the visor 12 with screws 5 being passed through the screw holes 24 thereof and the locating elements 121 of the visor 12.

Each of the sliding members 3 has a base part 31, and a protruding part 32, which projects from the base part 31 in a sloping position, and which is formed with a cavity 321, and several inner protrusions 3211 on an inner side thereof. Furthermore, each of the sliding members 3 has a through hole 322 extending through the base part 31 and communicating with the cavity 321 of the protruding part 32. The external diameter of the protruding parts 32 is slightly greater than the distance between every two opposing ones of the projecting portions 23 of the supporting members 2. The sliding members 3 are supported on respective ones of the supporting members 2 with the base parts 31 being held in the holding recesses 21, and with the protruding parts 32 projecting through the elongate holes 22; thus, each of the sliding members 3 is normally held in position within a selected one of the holding sections 221 of the corresponding elongate hole 22, and it can be linearly displaced along the elongate hole 22 by means of exerting force thereon.

The eyeglasses 4 includes a front part 41 with a curvature, two temples 42 joined to two ends of the front part 41, and two connecting parts 421, which are secured on the two temples 42 respectively, and which have several outer protrusions 4211 on an outer side thereof. The eyeglasses 4 are joined to the sliding members 3 with the connecting parts 421 being held in respective ones of the cavities 321 of the sliding members 3, and with screws 5 being passed through the through holes 322 and connected to the connecting parts 421; the outer protrusions 4211 of the connecting parts 421 will slightly engage the inner protrusions 3211 of the sliding members 3 therefore the eyeglasses 4 are normally held in position by means of the sliding members 3, and they can be changed in orientation in relation to the sun hat 1 by means of exerting force thereon, as shown in FIGS. 4 and 5.

In assembly, first the sliding members 3 are passed through respective ones of the elongate holes 22 of the supporting members 2 at the protruding parts 32 thereof, and the connecting parts 421 of the eyeglasses 42 are inserted in respective ones of the cavities 321 of the sliding members 3, and secured in position by the screws 5. Next, the supporting members 2 are secured on the visor 12 of the sun hat 1.

Figure 4:
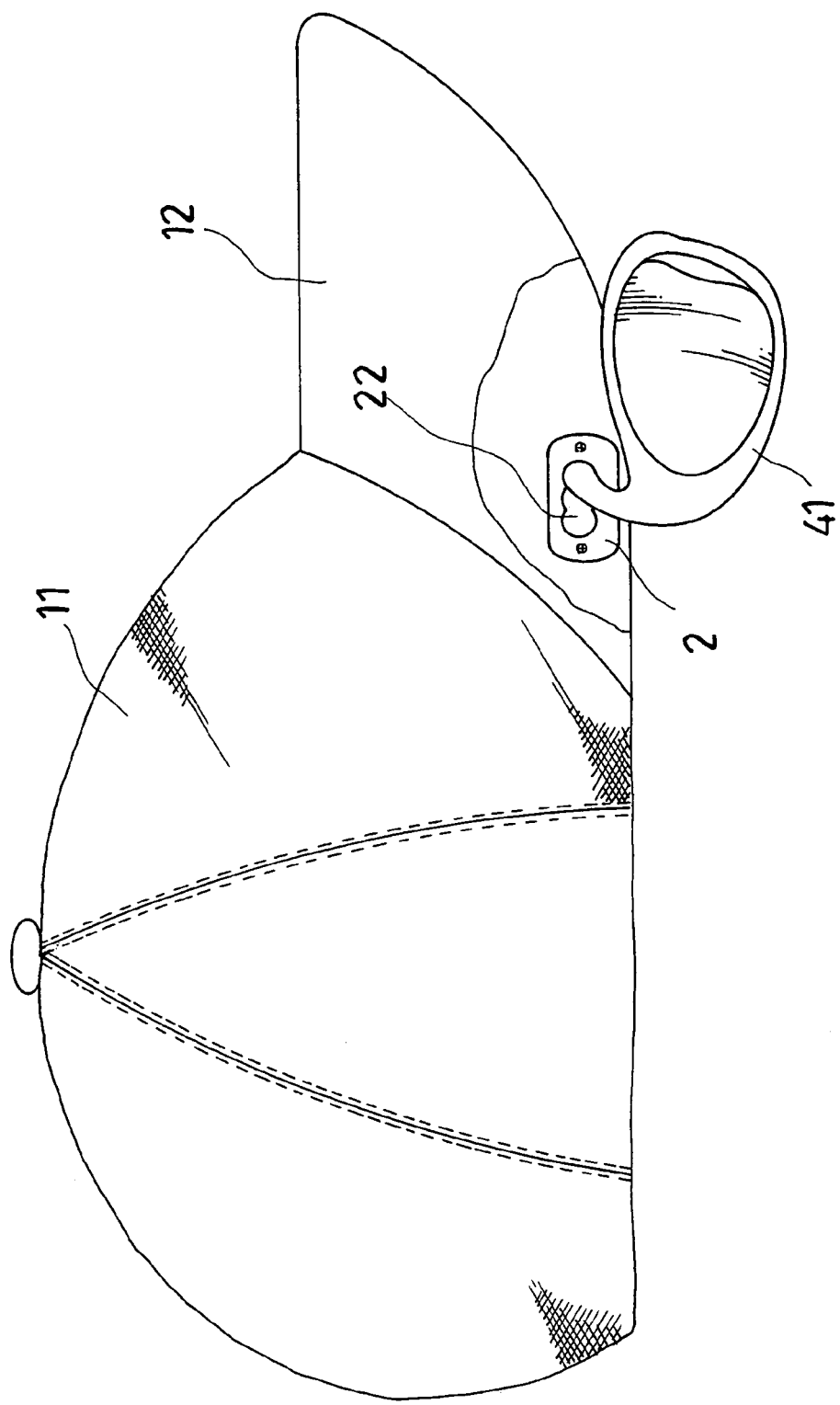
FIG. 4 is a side view of the present invention with the eyeglasses in the in-use position.
Figure 5:
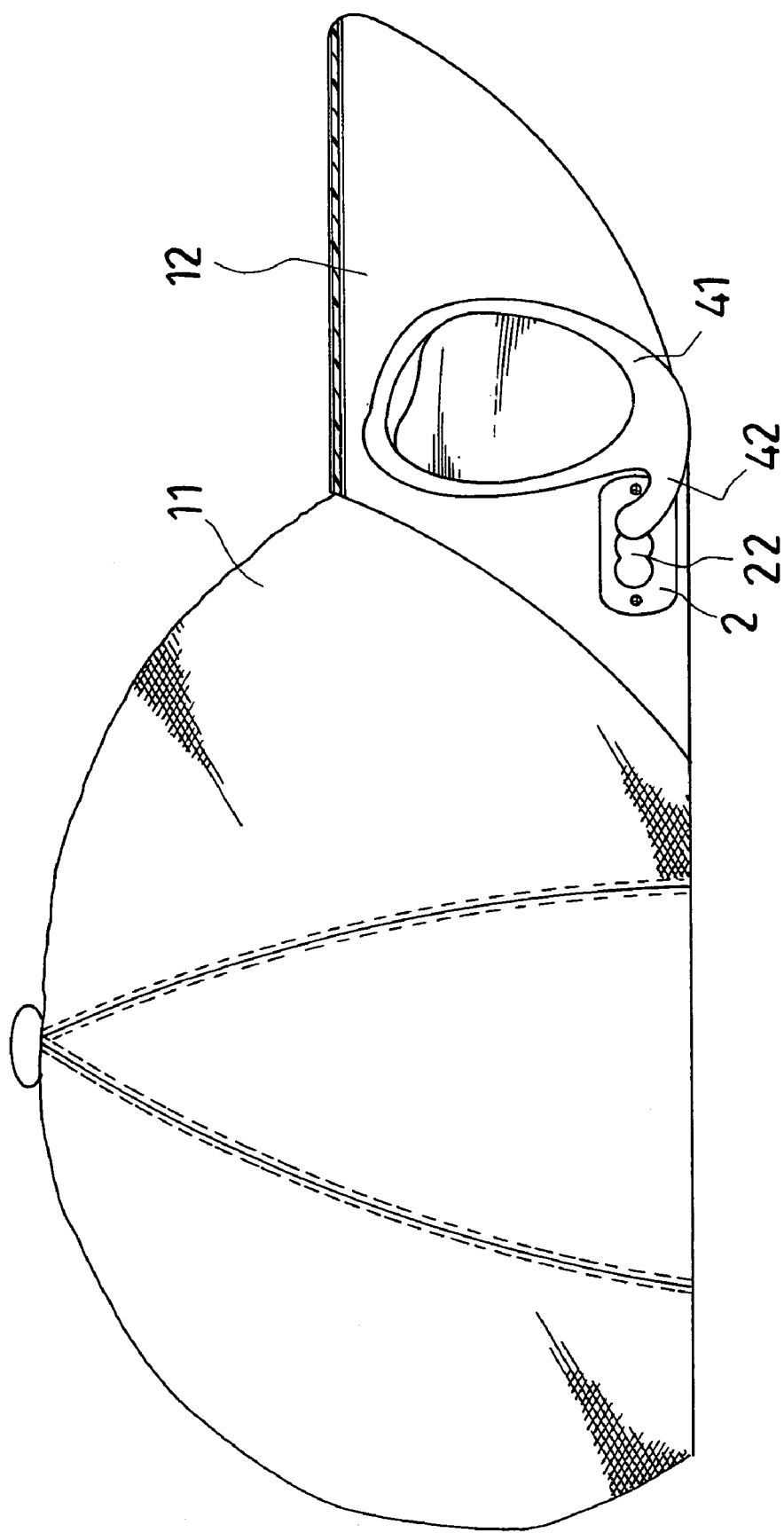
FIG. 5 is a side view of the present invention with the eyeglasses in the not-in-use position.

Therefore, the eyeglasses 4 can be pivoted to the in-use position for protecting the eyes of the wearer of the sun hat 1 from sunlight damage, as shown in FIG. 4. And, the eyeglasses 4 can be pivoted upwards so as to be close to the visor 12, as shown in FIG. 5, when the wearer of the sun hat 1 doesn't want to use the eyeglasses 4. In addition, the eyeglasses 4 can be moved forwards and backwards together with the sliding members 3 to adjust position according to the user's face shape.

From the above description, it can be easily seen that having the present sun hat with eyeglasses, the user won't have to carry an additional pair of sunglasses, and the eyeglasses can block wind besides protecting the user's eyes from sunlight damage. Furthermore, the eyeglasses can be moved forwards and backwards to adjust position according to the user's face shape, thus providing comfort to the user, and there will be less risk of the eyeglasses getting lost.

What is claimed is:

1. A sun hat with eyeglasses, comprising (a) a sun hat including a main body, and a visor; the visor having two locating element sets secured thereon;

(b) two supporting members securely joined to respective ones of the two locating element sets on the visor; each of the supporting members having:

a holding recess on a rear side thereof;

an elongate hole formed right in front of and communicating with the holding recess; and at least one pair of opposed projecting portions; the opposed projecting portions being formed on an inward edge of the supporting member that defines the elongate hole for dividing the elongate hole into plural holding sections;

(c) two sliding members supported on and linearly displaceable along respective ones the elongate holes of the supporting members; each of the sliding members having:

a base part held in a respective one of the holding recesses of the supporting members; and a protruding part projecting from the base part in a sloping position and sticking out through a corresponding elongate hole; the protruding part having a cavity; the protruding part being formed with a plurality of inner protrusions on an inner side thereof; an external diameter of the protruding part being slightly greater than a distance between every two opposing ones of the projecting portions of the supporting members;

a through hole extending through the base part and communicating with the cavity of the protruding part;

(d) a pair of eyeglasses pivoted to the sliding members; the eyeglasses including:

a front part;

two temples joined to two ends of the front part; and two connecting parts secured on the two temples respectively; each of the connecting parts having a plurality of outer protrusions on an outer side thereof; the connecting parts being held in respective ones of the cavities of the sliding members; the outer protrusions of the connecting parts engaging the inner protrusions of the protruding parts of the sliding members in such a way as not to prohibit angular displacement of the eyeglasses relative to the sliding members; screws being passed through the through holes of the sliding members and securely connected to the connecting parts;

thus allowing the eyeglasses to be pivoted from an in-use position to a not-in-use one, and allowing the eyeglasses to be adjusted in orientation as well as position.

* * * * *